(12) United States Patent
Adrianov et al.

(10) Patent No.: US 7,110,242 B2
(45) Date of Patent: Sep. 19, 2006

(54) ELECTRODE FOR ELECTRIC DOUBLE LAYER CAPACITOR AND METHOD OF FABRICATION THEREOF

(75) Inventors: Michail N. Adrianov, Moscow (RU);
Vera V. Litvinskaya, Moscow (RU);
Vitaly P. Popov, Moscow (RU);
Valentin V. Chebykin, Moscow (RU);
Pavel A. Shmatko, Moscow (RU);
Gennady V. Dvoretskiy, Moscow (RU)

(73) Assignee: C and T Company, Inc., Thornhill (CA)

( * ) Notice: Subject to any disclaimer, the term of this patent is extended or adjusted under 35 U.S.C. 154(b) by 169 days.

(21) Appl. No.: 09/793,375

(22) Filed: Feb. 26, 2001

(65) Prior Publication Data

US 2004/0246658 A1    Dec. 9, 2004

(51) Int. Cl.
*H01G 9/00* (2006.01)
(52) U.S. Cl. ...................................... 361/502; 361/503

(58) Field of Classification Search ........ 361/502–505; 423/445 R
See application file for complete search history.

(56) References Cited

U.S. PATENT DOCUMENTS 5,838,531 A * 11/1998 Saito et al. .................. 361/502
6,335,857 B1 * 1/2002 Takimoto et al. ........... 361/502

* cited by examiner

*Primary Examiner*—Eric W. Thomas
(74) *Attorney, Agent, or Firm*—Kilpatrick Stockton LLP

(57) ABSTRACT

A novel electrode and method of making the same. The electrode may be used in electric double layer capacitors. The electrodes include activated carbon that has been mixed with a thermosetting polymer binder. Activated carbon cloth may also be used. The method of modifying the activated carbon helps produce an electrode with considerably higher electric capacity, higher durability, and low resistance, while maintaining high conductivity. Additionally, the electrodes may be produced more quickly and inexpensively.

5 Claims, No Drawings

ELECTRODE FOR ELECTRIC DOUBLE LAYER CAPACITOR AND METHOD OF FABRICATION THEREOF

FIELD OF THE INVENTION

This invention relates generally to electrotechnics, and more particularly it can be applied for fabrication of energy storage devices.

DESCRIPTION OF THE PRIOR ART

Prior art teaches numerous ways to prepare electrodes for electric double layer capacitors, based on activated carbons. Russian Patent 2,058,054 describes a capacitor having one of its electrodes made of fibrous carbon material on which nickel is deposed. However, the capacitors assembled by the use of such electrodes have low capacities (not exceeding 46 F/cm$^3$).

Another electric double layer capacitor, disclosed in PCT WO 94/10698, has elastic electrodes, which consist of activated carbon containing big and small particles, porous elastic dielectric, and polymer binder. A drawback of these electrodes is their low mechanical strength, which renders the assembling process difficult.

As a prototype of the present invention, an electrode described in PCT WO 94/01879 is considered. It consists of activated carbon, graphite or carbon black, porous elastic dielectric, and polymer binder; the activated carbon comprising mixture of big (1–100 μm) and small particles (0.05–1.0 μm). The small particles content is in the range of 10–60% (w/w). Poroplast particles ranging from 1 to 50 μm or porous dielectric material fibers with diameter 0.3–50 μm and length 0.1–5 mm are applied as a porous dielectric. Polyvinylalcohol, polysaccharides, rubbers and fluorinated organics are preferably applied as polymer binders. However, the capacitor assembled using such electrodes has low capacity, rather high resistance due to the porous dielectric applied, and relatively low mechanical strength.

The goal of the present invention is to fabricate electrodes for electric double layer capacitor having high capacity, durability and low resistance, and maintaining high conductivity.

This goal is achieved by the electrode proposed hereafter that is prepared using a sorbent, e.g., activated carbon, uniformly mixed with particles of thermosetting polymer binder having average size 0.08–0.9 of the average size of the activated carbon particles. In accordance with the present invention, the electrode can be made of activated carbon and graphite or carbon black powder mixed with polymer particles. The average size of the graphite/carbon black particles is to be 0.02–1.4 of the average size of the activated carbon particles to assure uniformly distribution in the electrode bulk.

The electrodes described above can contain activated carbon cloth as well, tied to one or two sides of their surface by polymer particles. The average diameter of the cloth fiber is 0.2–0.5 of the average diameter of the sorbent particles.

The specified above size ratios of activated carbon, graphite/carbon black and polymer particles provide considerably improved electrical contact between the sorbent particles, which allows to achieve high capacity and durability and low resistance.

A method of fabrication of such electrodes according to the invention is disclosed. In Japanese Patent 2-13453, a method of preparation of electrodes is described, which comprises mixing of activated carbon fiber with fluorinated resin and an additive to improve the conductivity, subsequent pressing and heat treatment. This method is considered as a prototype of the invention hereafter. Its shortcoming is the impossibility to obtain a homogenic mixture of initial components, which leads to decrease in strength and increase in resistance, as well as to non-uniformity of the capacitance throughout the electrode bulk.

According to the invention, a method of fabrication of electrode having high capacity and durability and low resistance is disclosed herein. The method comprises mixing of a dry sorbent, e.g., activated carbon, with a polymer having apparent density of 0.05–0.19 g/cm$^3$, where the particle size of said polymer ranges from 0.07 to 1.2 of that of said sorbent, the apparent density of said sorbent is 0.2–9.0 of that of said polymer, and the volume ratio of said sorbent and said polymer is (6.0–0.7) to 1. The mixture is then pressed and heat-treated.

According to another preferred embodiment of the present invention, an electrode with good energetical parameters can be obtained by mixing of activated carbon, graphite or carbon black, and polymer, subsequent pressing and heat treatment.

According to another preferred embodiment of the present invention, an activated carbon cloth having micropore volume of 0.33–0.71 cm$^3$/g and mesopore volume of 0.08–0.15 cm$^3$/g can be applied as a sorbent in all cases. During the heat treatment, the cloth is held by polymer particles on one or both sides of the electrode, which becomes more expensive, but exhibits considerably higher capacity and durability.

It was experimentally determined that in order to guarantee uniformity of the resulting mixture and thus to achieve the invention goals, all the above-mentioned parameters are to be met.

To the authors' knowledge, the proposed electrode for electric double layer capacitor and the method of fabrication thereof were not described in the prior patent literature.

According to the present invention, the electrode is fabricated as follows: the apparent densities and average particle size of both activated carbon and polymer are determined by sieving analysis and their ratio calculated. The raw materials are then loaded in appropriate proportions into a blender using feeders. Subsequently, the uniform mixture is poured into a mould having the desired size and shape and pressed. The mixture is heat-treated at the softening temperature of the polymer, cooled and the resulting electrode taken out.

According to the invention, the same procedure is applied when graphite or carbon black is added to the starting mixture in appropriate ratio.

If said mixture contains a carbon cloth as well, it is first placed into the mould, then uniform mixture of dry sorbent and polymer is poured over, second cloth is added on the mixture if necessary, the composition is then pressed and heat-treated. After cooling, the electrode is taken off.

In all embodiments polyethylene is applied as a polymer. Low-apparent-density (0.05–0.19 g/cm$^3$) polymer consists of very light but relatively big particles having irregular shape and correspondingly developed surface. Such particles can mix uniformly with sorbent particles within wide ranges of their average sizes, apparent densities, and volumes as mentioned above. After heating up to softening temperature, the average "sieving" size of said polymer particles decreases 1.4–1.5 times to spheres corresponding to the real volume of the particles, while their apparent density increases 3–4 times.

When said polymer is mixed with activated carbon or with activated carbon and graphite or carbon black according to the invention, analyses found that the method proposed is highly effective and the uniformity of the resulting mixture is preserved during both transportation and form-filling, thus providing uniform final electrodes.

EXAMPLE 500 cm$^3$ of polyethylene, having apparent density of 0.100 g/cm$^3$ and average particle size of 0.538 mm, and 1000 cm$^3$ of activated carbon, having apparent density of 0.393 g/cm$^3$ and average particle size of 1.25 mm, are taken. In this way, the carbon-to-polymer ratios are as follows: average particle size 0.43, apparent densities 3.93, and volumes 2. The polymer and the activated carbon are first set into a blender and then poured into a mould, pressed at 2.0–12.0 kgf/cm$^2$ and heated to the softening point of the polymer. The mould is subsequently cooled, the electrode taken off, and its resistance and capacity measured.

The dependence of both resistance and capacity of the particle size ratio is monitored in Table 1.

As one can see, the best properties of the resulting electrode are achieved when the average particle size ratio of the polymer and the activated carbon is within the range 0.08–0.9.

TABLE 1

| | Average particle size of activated carbon, mm | Average particle size ratio, polymer/carbon | Electrode resistance, mΩ/cm$^2$ | Electrode capacitance, F/g sorbent |
|---|---|---|---|---|
| 1 | 2.27 | 0.071 | 37.9 | 121 |
| 2 | 2.21 | 0.080 | 29.8 | 373 |
| 3 | 1.34 | 0.284 | 17.7 | 682 |
| 4 | 0.51 | 0.317 | 12.6 | 1017 |
| 5 | 0.95 | 0.324 | 14.8 | 972 |
| 6 | 1.62 | 0.331 | 29.9 | 481 |
| 7 | 0.62 | 0.405 | 9.8 | 1243 |
| 8 | 0.67 | 0.432 | 15.1 | 731 |
| 9 | 0.30 | 0.700 | 23.9 | 446 |
| 10 | 0.28 | 0.900 | 31.1 | 382 |
| 11 | 0.41 | 0.941 | 38.4 | 137 |

Electrodes containing graphite or carbon black powder are fabricated much in the same way. The average particle size of said powder is to be 0.02–1.4 times that of the activated carbon one. If the limits of this range are exceeded, it becomes impossible to obtain well-homogenized final mixture. The resulting electrodes have low durability and non-uniform resistance throughout their bulk.

Numerous experiments allowed concluding that when an activated carbon cloth is applied in addition, its average thread diameter must range 0.2–0.5 of the average particle diameter of the activated carbon powder. Insufficient strength of the activated cloth is accounted for ratio below 0.2. If this ratio exceeds 0.5, damage is inflicted on the electrode electric contacts, namely with the separator when a cloth is one-sided and with the current collector when it is double-sided.

Table 2 illustrates the dependence of the electrode resistance and capacity on the average particle size ratio, apparent density of the polymer, and apparent densities ratio at constant ratio of activated carbon and polymer volumes.

From the data listed it can be concluded that the best resistance and capacity are obtained only if the polymer-to-carbon average particle size ratio is within the 0.07–1.2 range at apparent density of the polymer 0.05–0.19 g/cm$^3$ and carbon-to-polymer volume ratio of 0.2–9.0.

TABLE 2

| | Average particle size ratio, polymer/carbon | Polymer apparent density, g/cm$^3$ | Apparent density ratio, carbon/polymer | Electrode resistance, mΩ/cm$^2$ | Electrode capacity, F/(g active carbon) |
|---|---|---|---|---|---|
| 1. | 0.060 | 0.034 | 0.172 | 36.7 | 123 |
| 2. | 0.070 | 0.041 | 0.200 | 29.9 | 371 |
| 3. | 0.150 | 0.050 | 0.200 | 28.2 | 392 |
| 4. | 0.120 | 0.119 | 3.303 | 23.1 | 457 |
| 5. | 0.150 | 0.095 | 4.226 | 16.3 | 631 |
| 6. | 0.307 | 0.100 | 3.930 | 14.9 | 742 |
| 7. | 0.561 | 0.098 | 3.490 | 11.8 | 983 |
| 8. | 0.731 | 0.119 | 2.874 | 9.82 | 1237 |
| 9. | 0.906 | 0.095 | 3.600 | 10.79 | 1118 |
| 10. | 0.279 | 0.070 | 8.000 | 13.30 | 874 |
| 11. | 0.279 | 0.089 | 5.101 | 15.25 | 731 |
| 12. | 0.700 | 0.119 | 1.260 | 17.42 | 673 |
| 13. | 0.700 | 0.150 | 1.000 | 21.25 | 476 |
| 14. | 0.700 | 0.19 | 9.000 | 29.93 | 357 |
| 15. | 1.21 | 0.21 | 9.310 | 34.31 | 173 |
| 16. | 1.34 | 0.32 | 9.52 | 39.23 | 91 |

The volume ratio of the two components is also important for improvement of the electrode properties (see Table 3).

TABLE 3

| | Volume ratio carbon/polymer | Electrode resistance, mΩ/cm$^2$ | Electrode capacity, F/(g active carbon) |
|---|---|---|---|
| 1. | 6.380 | 39.92 | 131 |
| 2. | 6.000 | 31.30 | 387 |
| 3. | 0.120 | 29.87 | 472 |
| 4. | 4.680 | 16.70 | 651 |
| 5. | 3.025 | 13.30 | 924 |
| 6. | 2.221 | 9.72 | 1231 |
| 7. | 1.737 | 10.31 | 1153 |
| 8. | 1.415 | 12.47 | 897 |
| 9. | 1.162 | 17.39 | 742 |
| 10. | 0.986 | 23.27 | 469 |
| 11. | 0.703 | 28.75 | 371 |
| 12. | 0.681 | 41.23 | 123 |

From the presented data it follows that the best results are obtained when the activated carbon-to-polymer volume ratio is kept within the 6.0–0.7 range.

Furthermore, the inventors have concluded that if graphite or carbon black powder is used as a sorbent alongside the activated carbon, satisfactory electrode properties can be achieved only when the activated carbon, polymer, and graphite/carbon black are taken at (25–85):(150–250):1 ratio. Below this ratio the resulting mixture is inhomogeneous, which reflects in electrode having low durability, high resistance, and varying capacitive properties throughout the bulk.

If the sorbent is composed of activated carbon and cloth, the latter must possess micropore volume of 0.33–0.71 cm$^3$/g and mesopore volume of 0.08–0.15 cm$^3$/g. When activated cloth with micropore volume lower than 0.33 cm$^3$/g is employed, the resulting electrode has insufficient capacity, while activated cloth having micropore volume higher than 0.71 cm$^3$/g exhibits low mechanical strength. Electrodes employing activated cloth with mesopore volume lower than 0.08 cm$^3$/g have high resistance, and increase of the mesopore volume above 0.15 cm$^3$/g leads to lower capacity and higher self-discharge. Thus, the whole integrity of parameters for the activated carbon cloth disclosed herein provides the most favorable conditions for fabrication of electrodes to be used in electric double layer capacitors, which have high capacity and durability and low resistance.

In all above-mentioned embodiments, high uniformity of the initial mixture is achieved, the resulting electrodes being mechanically strong and highly conductive.

Thus, every feature of the present invention influences at higher or lesser degree the properties of the final product, their integrity being sufficient to characterize the technical solution presented herein.

What is claimed is:

1. An electrode for an electric double layer capacitor comprising activated carbon and polymer binder, wherein the polymer binder results from
   (a) mixing the activated carbon particles with polymer particles having an average size within the range of about 0.08 to about 0.9 of the average particle size of the activated carbon and
   (b) heating the polymer particles to their softening point.

2. The electrode of claim 1, wherein the polymer binder is polyethylene.

3. The electrode of claim 1, further comprising graphite and wherein the average particle size of the graphite is within the range of about 0.02 to about 1.4 of the average particle size of the activated carbon.

4. The electrode of claim 1, further comprising carbon black and wherein the average particle size of the carbon black is within the range of about 0.02 to about 1.4 of the average particle size of the activated carbon.

5. The electrode of claim 1, further comprising activated carbon cloth on one or both sides of said electrode, the average thread diameter of the carbon cloth lying within the range of about 0.2 to about 0.5 of the average particle size of the activated carbon.

* * * * *